United States Patent [19]

Schmidt et al.

[11] 4,205,108

[45] May 27, 1980

[54] SURFACE FINISHED FABRIC

[75] Inventors: Klaus Schmidt, Hirschberg; Harald Hoffmann, Mannheim, both of Fed. Rep. of Germany

[73] Assignee: Firma Carl Freudenberg, Weinheim, Fed. Rep. of Germany

[21] Appl. No.: 796,504

[22] Filed: May 12, 1977

[30] Foreign Application Priority Data

May 13, 1976 [DE] Fed. Rep. of Germany ....... 2621141

[51] Int. Cl.² .......................... D06N 7/04; B32B 3/00
[52] U.S. Cl. .................... 428/147; 156/62.4; 156/279; 427/25; 427/195; 427/245; 427/355; 427/366; 428/90; 428/151; 428/904
[58] Field of Search ............... 427/25, 26, 27, 33, 427/185, 195, 32, 245, 180, 189, 194, 366, 259, 355; 156/279, 62.4; 428/151, 147, 904, 90

[56] References Cited

U.S. PATENT DOCUMENTS

| | | | |
|---|---|---|---|
| 2,761,177 | 9/1956 | Walters | 156/279 |
| 2,926,100 | 2/1960 | Weigle et al. | 427/194 |
| 3,016,599 | 1/1962 | Perry | 428/903 X |
| 3,034,927 | 5/1962 | Fairclough et al. | 427/245 |
| 3,067,469 | 12/1962 | Yarrison | 427/194 X |
| 3,232,780 | 2/1966 | Kupits | 427/194 |
| 3,385,722 | 5/1968 | Weaver et al. | 427/194 |
| 3,503,778 | 3/1970 | Corbett et al. | 427/195 |
| 3,525,662 | 8/1970 | Padgett et al. | 427/194 X |
| 3,735,925 | 5/1973 | Benedek et al. | 427/27 X |
| 3,888,207 | 6/1975 | Stutz | 427/25 X |
| 3,914,501 | 10/1975 | Miller et al. | 156/62.4 |
| 3,916,447 | 11/1975 | Thompson | 428/903 X |
| 4,039,703 | 8/1977 | Kamijo et al. | 427/195 X |
| 4,041,203 | 8/1977 | Brock et al. | 428/903 X |
| 4,069,026 | 1/1978 | Simm et al. | 264/24 X |

Primary Examiner—Shrive P. Beck
Attorney, Agent, or Firm—Sprung, Felfe, Horn, Lynch & Kramer

[57] ABSTRACT

A sheet material finished on at least one side with a coherent surface layer is formed by electrostatically spraying a solution or dispersion of plastics producing fibers from 0.1 to 30 microns in diameter. Then the mat is consolidated with heat and pressure, whereby the fibers form a tight bond with the surface of the support material which is thus finished.

3 Claims, No Drawings

SURFACE FINISHED FABRIC

BACKGROUND

The invention concerns a method of making a fabric having a finish produced on at least one side by means of a coherent surface layer.

It is known to finish the surfaces of support materials, such as textile support materials, for example, and also the surfaces of wood, plastic, metal or the like, by means of surface coatings. These surface coatings are, as a rule, of an impermeable, film-like nature, and bring about an improvement of the mechanical properties of the base materials as regards wear-resistance, surface roughness, tear strength, or the like, and at the same time they protect against attack by liquids and gases which may have a harmful effect on the base material.

At the same time, the surface coatings block the emergence of volatile components of the base material or their penetration through the base material, and, lastly, they bring about a visually appealing sheen.

Numerous processes are known for the production of the surface coatings outlined above. For example, the surface coatings can be produced by direct or reversal processes, by mechanical spraying, casting, roller application, pressing or dipping. Liquid systems, particularly plastisols, dispersions or dissolved plastics are applied, which are then hardened in some suitable manner by a physical or chemical process. The applicability of all these processes is limited by the interaction of the coating systems with the base material. To obviate this disadvantage, it has also been proposed to bond systems which have fully reacted and contain no solvents, such as films for example, onto support materials. This bonding process also results in a film-like surface, which is mostly impermeable. The process, however, is limited by the often less than optimum adherence between the materials to be bonded together. The bonding of impermeable films onto impermeable support materials with the aid of adhesives containing solvents is particularly problematical.

The object of the invention is the development of a process for the production of materials finished at least on one side by means of a coherent surface layer, which will make it possible to adapt the properties of the surface finish with regard to porosity or microporosity or permeability to vapors and gases to a particular application without great effort in experimentation, particularly when microporous surface layers and layers permeable to vapor and gases are desired, but also when completely impermeable layers are desired.

A process is proposed which is characterized in that a very fine fiber mat of staple and/or endless fibers is applied to the side or sides of the support material which are to be finished, and the mat thus deposited is then consolidated and smoothed, with the application of pressure if desired, whereupon it simultaneously enters into a firm bond with the surface of the support material that is thus finished.

The process is particularly conceived for very fine thermoplastic fibers which are consolidated without the use of an additional binding agent by the application of pressure and heat in a known manner, and are simultaneously smoothed to form the coherent surface layer, it being possible to vary and quite precisely control the properties of this surface layer as regards porosity or microporosity and permeability to vapors and gases by the application of the optimum pressures and temperatures for the desired purpose. The term "very fine fibers," as used herein, is to be understood to mean fibers of a diameter of about 0.1 to 30 microns, fiber diameters of about 1 to 20 microns having proven to be particularly suitable.

The very fine fibers can be produced in any desired manner, i.e., very fine fibers prepared in any desired manner can be applied to the surfaces of the support materials that are to be finished, and the surfaces can then be finished in the manner described by the invention, by consolidation and smoothing of the fiber covering while simultaneously bonding it to the support material.

The very fine fibers may comprise nylon, polyester, polyethylene, polypropylene, polystyrene, acetate, polycarbonate, polysulfone, and the like, being as short as some millimeters up to centimeters as well as endless. They may be deposited from about 5 to 50 $g/m^2$ onto substrates which can be of varied composition, e.g. woven or non-woven textiles, artificial leather of polyurethane or other base, foams of polyurethane or rubber, plastic foils, or even wood or aluminum.

Surprisingly, however, it has been found that very fine fibers which are obtained by means of an electrodynamic spray process and are sprayed directly onto the support material, produce, after consolidation and smoothing in accordance with the invention, a surface finish which is not only especially attractive in appearance, but also one which can be controlled with regard to its characteristics of porosity and permeability in a manner which hitherto has never been achieved. Thus it is possible, for example, by the use of very fine thermoplastic fibers and thermal consolidation and smoothing, to provide a top layer on a textile support material and thereby obtain a laminate having properties virtually equal to those of natural leather. From the process point of view, this leather substitute material is extraordinarily simple to produce. All that is necessary is to apply to a woven or nonwoven textile fabric very fine fibers obtained and sprayed on by electrostatic methods and then, in a single calendering process, to smooth and consolidate the very fine fiber mat thus deposited.

In the performance of the electrostatic spray process, apparatus which have proven to be especially effective are those which are described in U.S. Pat. No. 4,069,026 and in commonly assigned patent Application Ser. No. 792,260, filed May 2, 1977, now U.S. Pat. No. 4,144,553, the disclosure of which is incorporated herein by reference.

If the material to be surface finished is sprayed by means of a suitable spray electrode, such as the kind described in the two patent applications mentioned above, a very uniform, very fine fiber mat free of solvent and binding agent, formed of fibers of a diameter of about 0.1 to 30 microns, will be deposited thereon. Then the fiber mat sprayed on the surface is consolidated as desired, by heat and pressure, in the described manner. Transparent or opaque surfaces can thus be obtained, which will satisfy requirements of fashion materials with regard to appearance. Without the otherwise necessary expense, either high-gloss or matt surfaces can be produced. The surface layers will be microporous or impermeable, according to their method of manufacture.

Suitable spray media are known lacquer systems, dissolved plastics, dispersions, or mixtures of solids. Particularly broad in its usefulness in this connection is the apparatus described in U.S. Pat. No. 4,144,553 for electrodynamic spraying, which also permits the patterened application of very fine fiber mats to the support material by means of the masking described therein.

The following examples will serve to explain the process of the invention without limiting it to these examples:

EXAMPLE 1

A pattern-printed, rubber-bonded nonwoven fabric is sprayed by means of a band electrode as described in U.S. Pat. No. 4,144,553 with polycarbonate fibers of a thickness of 5 to 6 microns. The weight of the applied spray mat amounts to 15 g/m$^2$.

Then the spray mat is consolidated in a band calendar at 190° C. to form a transparent, glossy finish. The glossy finish, which can be applied to one or both sides, is microporous, permeable to water vapor and gas, and gives the material leather-like properties with regard to appearance, touch and permeability.

EXAMPLE 2

A polyurethane artificial leather is sprayed in the manner described in Example 1 with polycarbonate fibers of a diameter of about 10 microns. The weight of the spray coating amounts to 10 g/m$^2$. Then the spray mat is consolidated in a band calendar at a temperature of 200° C. to form a highly glossy layer, and thus produces a transparent gloss finish. The material is impermeable to water vapor and has an outstanding surface gloss combined with an excellent slippery quality.

It will be appreciated that the instant specification and examples are set forth by way of illustration and not limitation, and that various modifications and changes may be made without departing from the spirit and scope of the present invention.

What is claimed is:

1. A process for the production of a sheet material finished on at least one side with a coherent surface layer, comprising said process consisting essentially of electrostatically spraying onto at least one surface of a rubber bonded support material fibrous substrate a liquid medium containing thermoplastic resinous fiber-forming material which medium upon spraying forms a very fine mat of fibers having a diameter of about 0.1 to 30 microns, and then applying to the mat sufficient heat and pressure to consolidate the fibers to one another and to the substrate while smoothing the surface to form a permeable microporous finished sheet material of high surface luster.

2. A process according to claim 1, wherein the fibers are deposited in about 5–50 g/m$^2$.

3. A finished sheet material produced by the process of claim 1.

* * * * *

UNITED STATES PATENT AND TRADEMARK OFFICE
CERTIFICATE OF CORRECTION

PATENT NO. : 4,205,108

DATED : May 27, 1980

INVENTOR(S) : Klaus Schmidt et al.

It is certified that error appears in the above-identified patent and that said Letters Patent is hereby corrected as shown below:

Column 4, line 12, delete "comprising"

Column 4, line 15, delete "support material".

*Signed and Sealed this*

*Twenty-seventh* Day of *July 1982*

[SEAL]

*Attest:*

*Attesting Officer*

GERALD J. MOSSINGHOFF

*Commissioner of Patents and Trademarks*